US010417361B1

(12) United States Patent
Floyd et al.

(10) Patent No.: US 10,417,361 B1
(45) Date of Patent: Sep. 17, 2019

(54) SYSTEM, METHOD, AND COMPUTER PROGRAM PRODUCT FOR DEBUGGING IN AN ELECTRONIC DESIGN FILE

(71) Applicant: Cadence Design Systems, Inc., San Jose, CA (US)

(72) Inventors: Michael James Floyd, Natick, MA (US); Philip Benedict Giangarra, Medway, MA (US); Abu Nasser Mohammed Abdullah, Methuen, MA (US); Zhengang Hong, Winchester, MA (US); Joseph Ralph Horn, Petah Tikva (IL)

(73) Assignee: Cadence Design Systems, Inc., San Jose, CA (US)

( * ) Notice: Subject to any disclaimer, the term of this patent is extended or adjusted under 35 U.S.C. 154(b) by 133 days.

(21) Appl. No.: 15/493,706

(22) Filed: Apr. 21, 2017

(51) Int. Cl.
*G06F 17/50* (2006.01)
*G06F 3/0484* (2013.01)

(52) U.S. Cl.
CPC ........ *G06F 17/504* (2013.01); *G06F 3/04842* (2013.01); *G06F 3/04847* (2013.01); *G06F 2217/06* (2013.01)

(58) Field of Classification Search
USPC .......................................... 716/108
See application file for complete search history.

(56) References Cited

U.S. PATENT DOCUMENTS

| | | | | |
|---|---|---|---|---|
| 2009/0307640 | A1* | 12/2009 | Chapman | G06F 17/5045 716/136 |
| 2011/0173583 | A1* | 7/2011 | Barwin | G06F 17/5068 716/106 |
| 2011/0218779 | A1* | 9/2011 | Palisetti | G06F 17/10 703/2 |
| 2015/0113487 | A1* | 4/2015 | Ford | G06F 17/5045 716/102 |
| 2018/0330032 | A1* | 11/2018 | Buck | G06F 17/5031 |

* cited by examiner

*Primary Examiner* — Mohammed Alam
(74) *Attorney, Agent, or Firm* — Mark H. Whittenberger, Esq.; Holland & Knight LLP

(57) ABSTRACT

Embodiments of the present disclosure may include receiving, using a processor, an ASCII file including timing and power parameters associated with a portion of the electronic circuit design. Embodiments may further include analyzing the ASCII file and displaying, at a graphical user interface, information from the ASCII file. Embodiments may also include parsing, via the graphical user interface, the information using one or more user-selectable parameters.

17 Claims, 19 Drawing Sheets

SYSTEM, METHOD, AND COMPUTER PROGRAM PRODUCT FOR DEBUGGING IN AN ELECTRONIC DESIGN FILE

FIELD OF THE INVENTION

The present disclosure relates to electronic design automation, and more specifically, to a method for debugging in an electronic design file.

BACKGROUND

In large system-on-a-chip ("SoC") designs debugging the effects of power intent when using the Liberty format (i.e., .lib) is very difficult. The .lib file is an ASCII representation of the timing and power parameters associated with any cell in a particular semiconductor technology. The timing and power parameters may be obtained by simulating the cells under a variety of. conditions and the data may be represented in the .lib format. The Liberty description is outside of the HDL description and its effects are difficult to understand. Liberty data is relevant to formal verification and is also spread through the liberty files often with thousands of lines between relevant portions. To fully understand what is going on it is difficult to see this in the file.

The use of Liberty to apply low power intent to a design creates a lot of unknowns in the simulation which are very difficult to understand in the context of the HDL design. A liberty file may include information relevant to verification but it also contains information for downstream backend tools which may add information not relevant to HDL verification. It is this extra information that causes a problem in that the file will have relevant pieces dispersed through the file often with 1000's of lines of information that are not relevant. As such, trying to understand the verification aspects in the file is difficult given the distance between lines in the file.

SUMMARY

In one or more embodiments of the present disclosure, a computer-implemented method for use in an electronic circuit design. The method may include receiving, using a processor, an ASCII file including timing and power parameters associated with a portion of the electronic circuit design. The method may include analyzing the ASCII file and displaying, at a graphical user interface, information from the ASCII file. The method may also include parsing, via the graphical user interface, the information using one or more user-selectable parameters.

One or more of the following features may be included. In some embodiments, the ASCII file may be a Liberty file. The information from the ASCII file may include at least one of power information, ground information, pin information, direction information, related power information, related ground information, and power down function information. The Liberty file may be compiled and stored in a queryable database. The graphical user interface may be dynamically linked to a simulation. In some embodiments, parsing may include filtering the information based upon, the one or more user-selectable parameters to generate a subset of the information. The method may include allowing for a selection of an item in the graphical user interface and generating a change in a second graphical user interface, based upon, at least in part, the selection.

In some embodiments, a computer-readable storage medium for electronic design simulation is provided. The computer-readable storage medium may have stored thereon instructions that when executed by a machine result in one or more operations. Operations may include receiving, using a processor, an ASCII file including timing and power parameters associated with a portion of the electronic circuit design. Operations may include analyzing the ASCII file and displaying, at a graphical user interface, information from the ASCII file. Operations may also include parsing, via the graphical user interface, the information using one or more user-selectable parameters.

One or more of the following features may be included. In some embodiments, the ASCII file may be a Liberty file. The information from the ASCII file may include at least one of power information, ground information, pin information, direction information, related power information, related ground information, and power down function information. The Liberty file may be compiled and stored in a queryable database. The graphical user interface may be dynamically linked to a simulation. In some embodiments, parsing may include filtering the information based upon, the one or more user-selectable parameters to generate a subset of the information. Operations may include allowing for a selection of an item in the graphical user interface and generating a change in a second graphical user interface, based upon, at least in part, the selection.

In one or more embodiments of the present disclosure, a system may include a computing device having at least one processor configured to receive an ASCII file including timing and power parameters associated with a portion of the electronic circuit design. The at least one processor may be further configured to analyze the ASCII file and display, at a graphical user interface, information from the ASCII file. The at least one processor may be further configured to parse, via the graphical user interface, the information using one or more user-selectable parameters.

One or more of the following features may be included. In some embodiments, the ASCII file may be a Liberty file. The information from the ASCII file may include at least one of power information, ground information, pin information, direction information, related power information, related ground information, and power down function information. The Liberty file may be compiled and stored in a queryable database. The graphical user interface may be dynamically linked to a simulation. In some embodiments, parsing may include filtering the information based upon, the one or more user-selectable parameters to generate a subset of the information. The at least one processor may be configured to allow for a selection of an item in the graphical user interface and generating a change in a second graphical user interface, based upon, at least in part, the selection.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

FIG. 12 is a schematic depicting aspects of the display process in accordance with an embodiment of the present disclosure;

Like reference symbols in the various drawings may indicate like elements.

DETAILED DESCRIPTION

Figure 1:
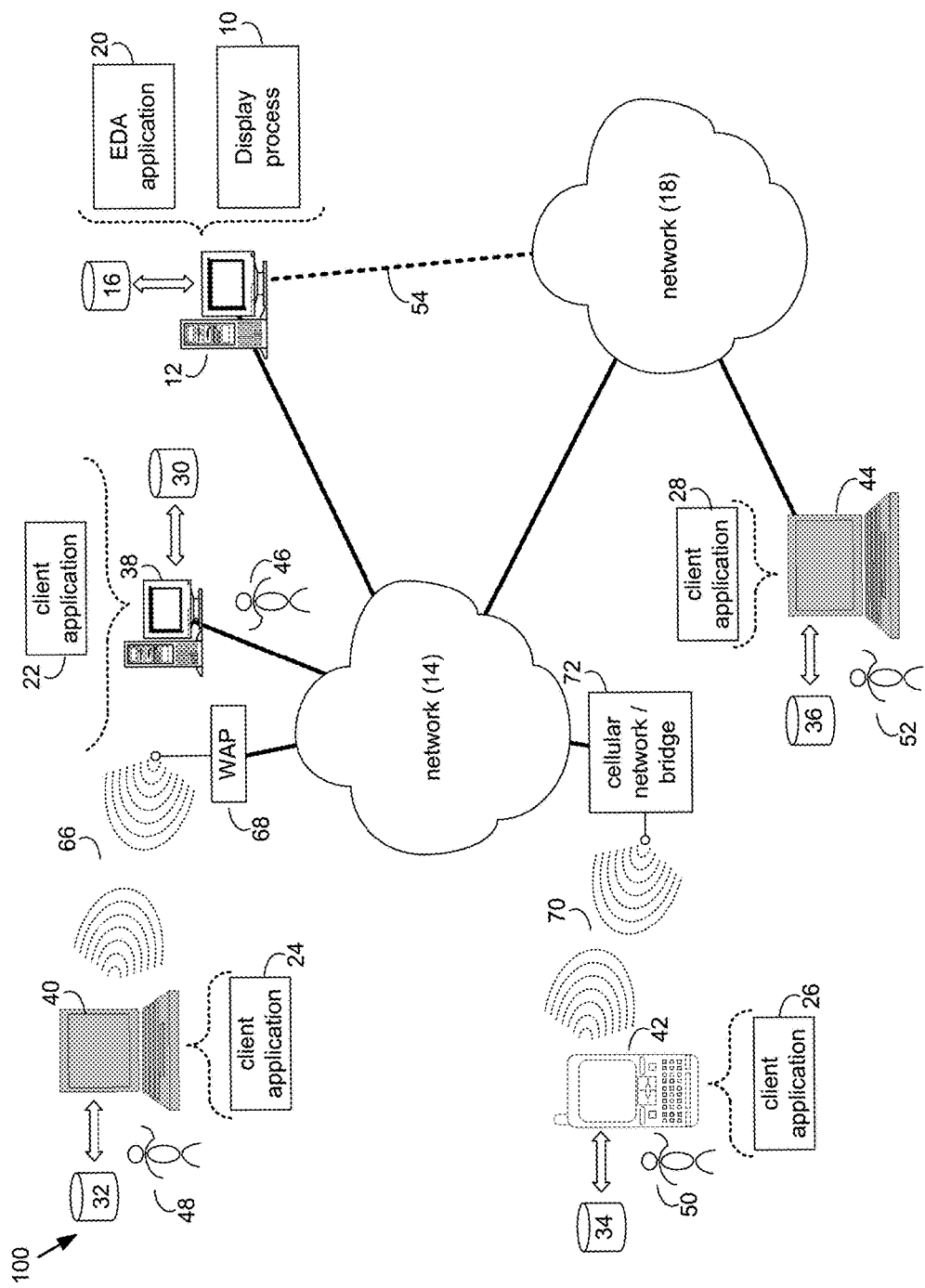
FIG. 1 is a system diagram depicting aspects of the display process in accordance with an embodiment of the present disclosure.

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIG. 1, there is shown a display process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, the report generation process may reside on and be executed, in whole or in part, by a client electronic device, such as a personal computer, notebook computer, personal digital assistant, or the like.

The instruction sets and subroutines of display process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM). Storage device 16 may include various types of files and file types including but not limited, to hardware description language (HDL) files, which may contain the port type descriptions and executable specifications of hardware blocks.

Server computer 12 may execute a web server application, examples of which may include but are not limited to: Microsoft IIS, Novell Webserver™, or Apache® Webserver, that allows for HTTP (i.e., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute an electronic design automation (EDA) application (e.g., EDA application 20), examples of which may include, but are not limited to those available from the assignee of the present application. EDA application 20 may interact with one or more EDA client applications (e.g., EDA client applications 22, 24, 26, 28) for report generation. EDA application 20 may be referred to herein as a design tool.

Display process 10 may be a stand alone application, or may be an applet/application/script that may interact with and/or be executed within EDA application 20. In addition/as an alternative to being a server-side process, the process may be a client-side process (not shown) that may reside on a client electronic device (described below) and may interact with an EDA client application (e.g., one or more of EDA client applications 22, 24, 26, 28). Further, display process 10 may be a hybrid server-side/client-side process that may interact with EDA application 20 and an EDA client application (e.g., one or more of client applications 22, 24, 26, 28). As such, display process 10 may reside, in whole, or in part, on server computer 12 and/or one or more client electronic devices.

The instruction sets and subroutines of EDA application 20, which may be stored on storage device 16 coupled to server computer 12 may be executed by one or more processors (not shown) and one or more memory modules (not shown) incorporated into server computer 12.

The instruction sets and subroutines of EDA client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access EDA application 20 and may allow users to e.g., utilize display process 10.

Users 46, 48, 50, 52 may access EDA application 20 directly through the device on which the client application (e.g., client applications 22, 24, 26, 28) is executed, namely client electronic devices 38, 40, 42, 44, for example. Users 46, 48, 50, 52 may access EDA application 20 directly through network 14 or through secondary network 18. Further, server computer 12 (i.e., the computer that executes EDA application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (i.e., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system (Windows CE is a registered trademark of Microsoft Corporation in the United States, other countries, or both).

As discussed above, in large system-on-a-chip ("SoC") designs debugging the effects of power intent when using the Liberty format (i.e., .lib) is very difficult. The .lib file is an ASCII representation of the timing and power parameters associated with any cell in a particular semiconductor technology. The timing and power parameters may be obtained by simulating the cells under a variety of conditions and the data may be represented in the .lib format. The Liberty description is outside of the HDL description and its effects are difficult to understand. Liberty data is relevant to formal verification and is also spread through the liberty files often with thousands of lines between relevant portions. To fully understand what is going on it is difficult to see this in the file.

Accordingly, embodiments of display process 10 may be configured to receive and analyze the relevant portions of the liberty file concerning the liberty instances and collects the information into a compact graphical display. This may provide the user with the information (e.g., with hyperlinks into the original source) if corrections in the original file are required.

As discussed above, the use of Liberty to apply low power intent to a design creates a lot of unknowns in the simulation which are very difficult to understand in the context of the HDL design. A liberty file may include information relevant to verification but it also contains information for downstream backend tools which may add information not relevant to HDL verification. It is this extra information that causes a problem in that the file will have relevant pieces dispersed through the file often with 1000's of lines of information that are not relevant. As such, trying to understand the verification aspects in the file is difficult given the distance between lines in the file.

Embodiments of display process 10 may use a compiled version of the liberty file that creates a database that can be queried. Accordingly, embodiments disclosed herein may take the relevant information for a specific liberty cell instance and collect the pieces into a compact graphical display to present the important pieces to the user for the purposes of debugging. In some embodiments, the display may also be used to index into the actual liberty file so the user can view where the data came from. Additionally and/or alternatively, if corrections are required, they may be placed directly in the source where edits can be made. As shown in further detail below, display process 10 may generate a compact graphical display which displays the information for a cell/instance that has the liberty power intent associated with it.

Figure 2:
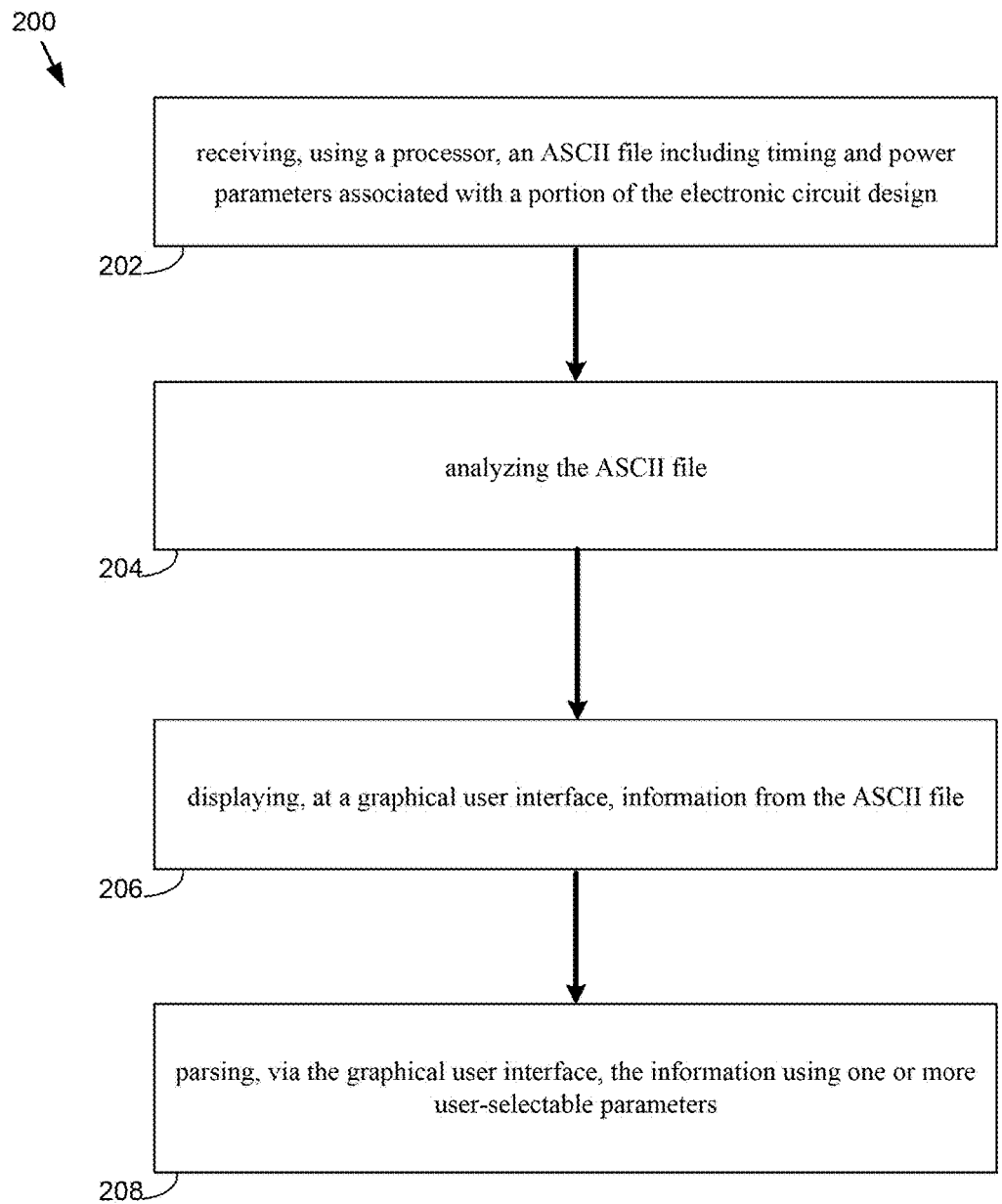
FIG. 2 is a flow diagram of a process in accordance with one or more embodiments of the present disclosure.

Referring now to FIG. 2, a flowchart 10 depicting operations consistent with embodiments of display process 10 are provided. Operations may include receiving 202, using a processor, an ASCII file including timing and power parameters associated with a portion of the electronic circuit design. Operations may also include analyzing 204 the ASCII file and displaying 206, at a graphical user interface, information from the ASCII file. Operations may also include parsing 208, via the graphical user interface, the information using one or more user-selectable parameters.

Figure 3:
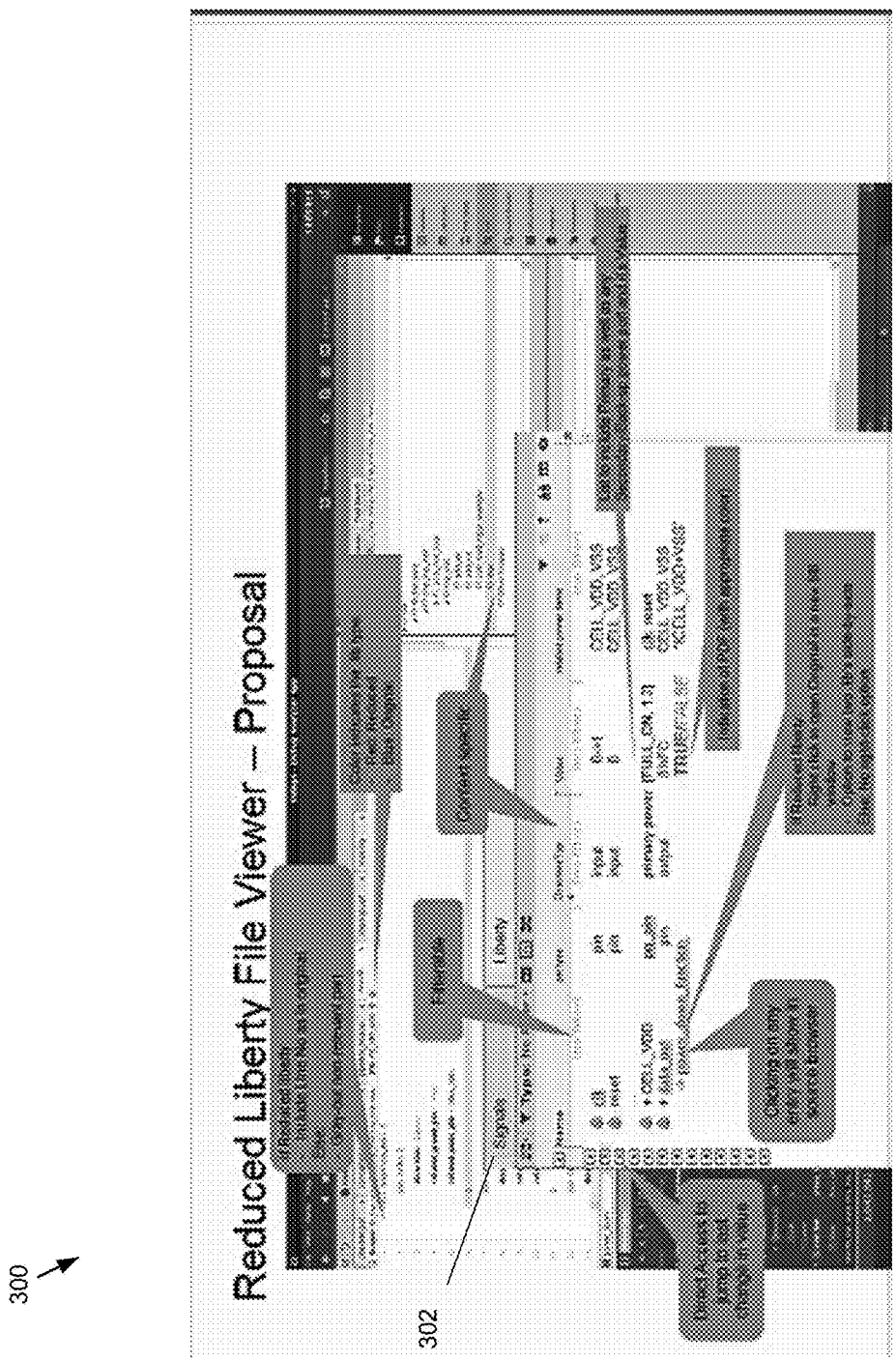
FIG. 3 is a schematic depicting aspects of the display process in accordance with an embodiment of the present disclosure.

Referring now to FIG. 3, a graphical user interface 300 consistent with an embodiment of display process 10 is provided. As is shown in GUI 300 a number of different GUIs or subpanels may be included therein. GUI 300 may include condensed viewer 302, which may include, but is not limited to, various signal information, Liberty information, etc. In some embodiments, display process 10 may be configured to analyze the Liberty file and extract information therefrom. Some of this information may include, but is not limited to, one or more pins (e.g., the data pins, a clock, a reset, etc.) and it may extract all of the power/ground ("PG") pins. For example, the power, the ground, the N well, P well, etc. Display process 10 may also be configured to produce condensed viewer 302 where it may display all of the data pins and the PG pins while also providing information regarding the type of pin. Some types may include, but are not limited to, input, output, primary power, N well, P well, and may provide the value. For example, data pins may have a value of 0 or 1, Z, X, etc. In some embodiments, PG pins may be either full on, partial on, off, etc.

In some embodiments, display process 10 may include a power down function which may be extracted from the Liberty file, which may be either true or false. In some embodiments, the expression may also be provided. For example, in this case, the expression was bang cell_VDD with VSS. And for a related power/related ground, it might be just VDD and VSS as shown in FIG. 3. In other words, when VDD is a zero or VSS is a 1, then the output or input would be corrupted. Additionally and/or alternatively, when these are both at the correct values then the input or output is not corrupted.

Figure 4:
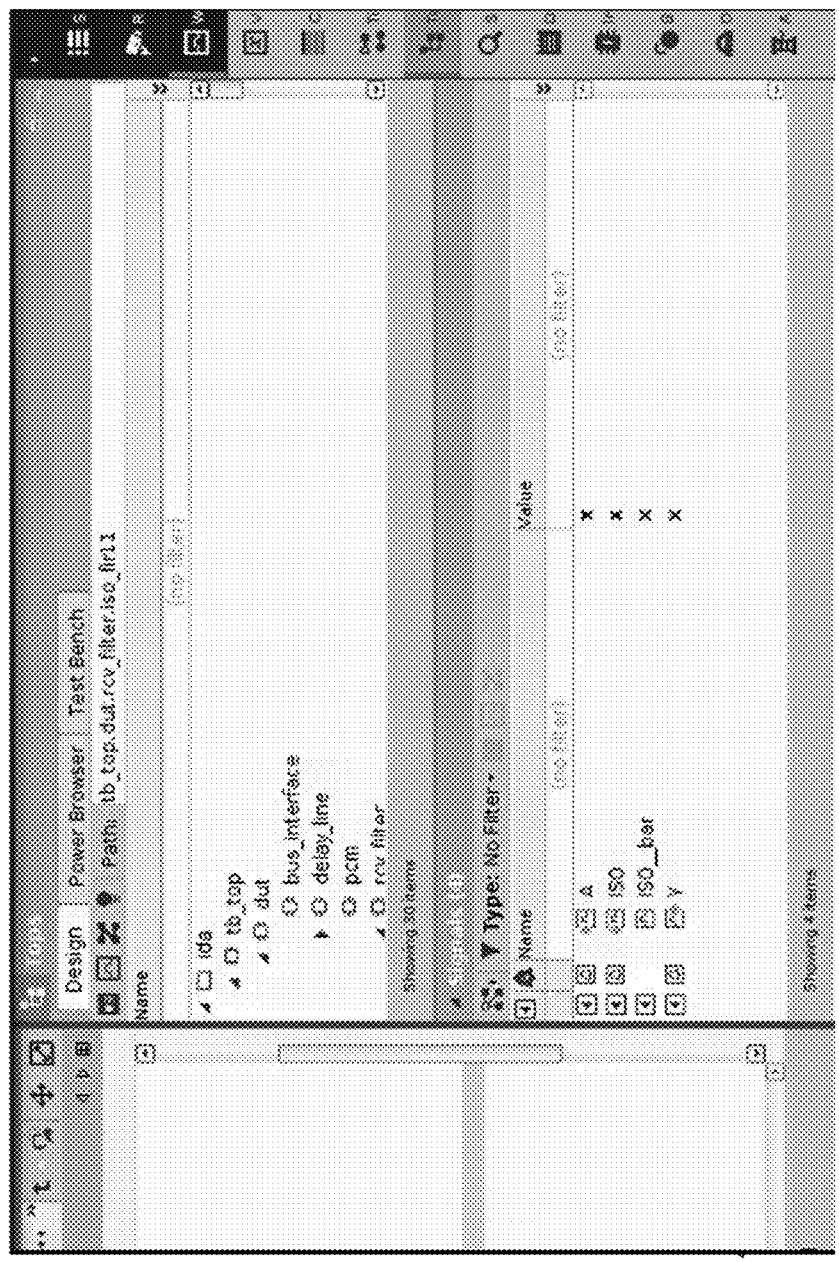
FIG. 4 is a schematic depicting aspects of the display process in accordance with an embodiment of the present disclosure.
Figure 5:
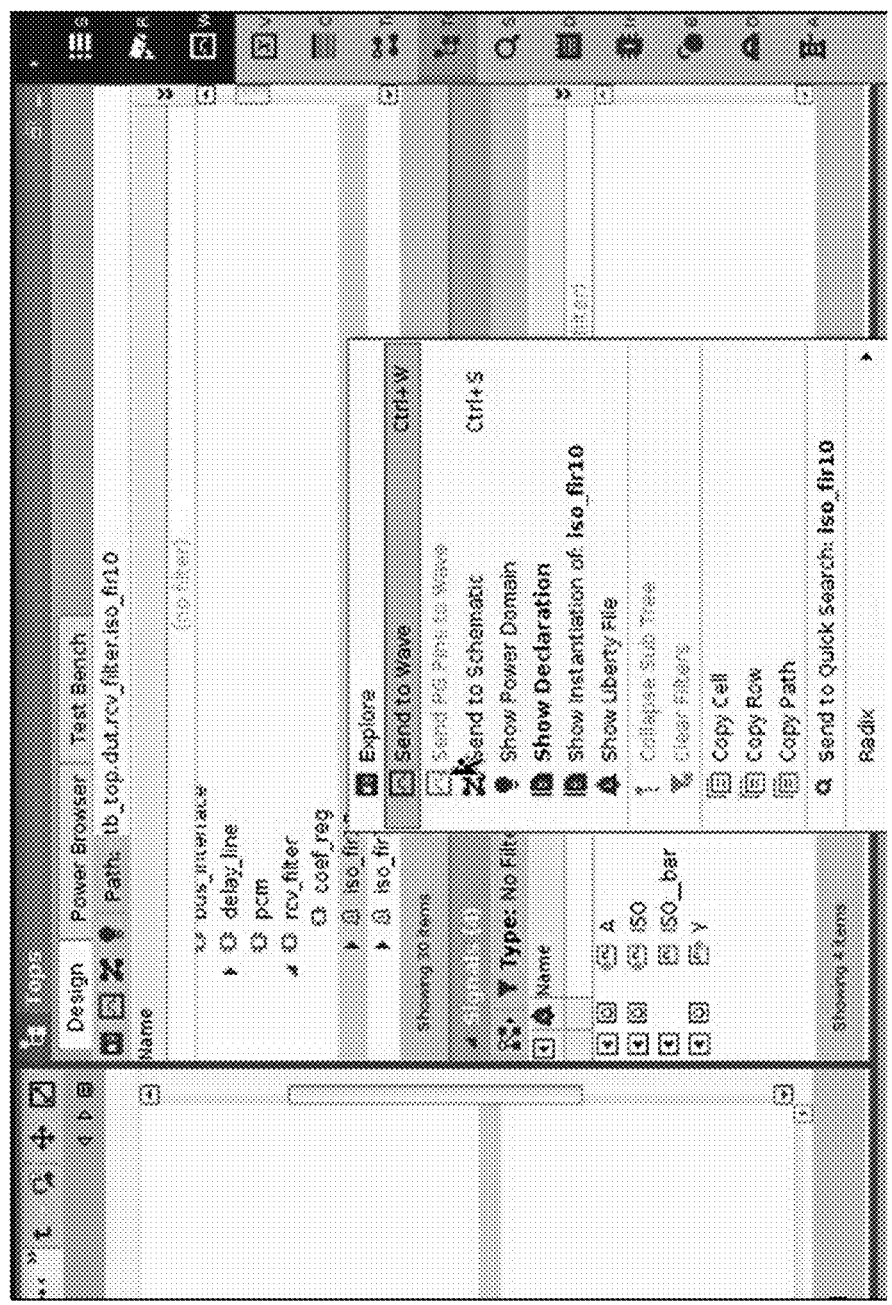
FIG. 5 is a schematic depicting aspects of the display process in accordance with an embodiment of the present disclosure.
Figure 6:
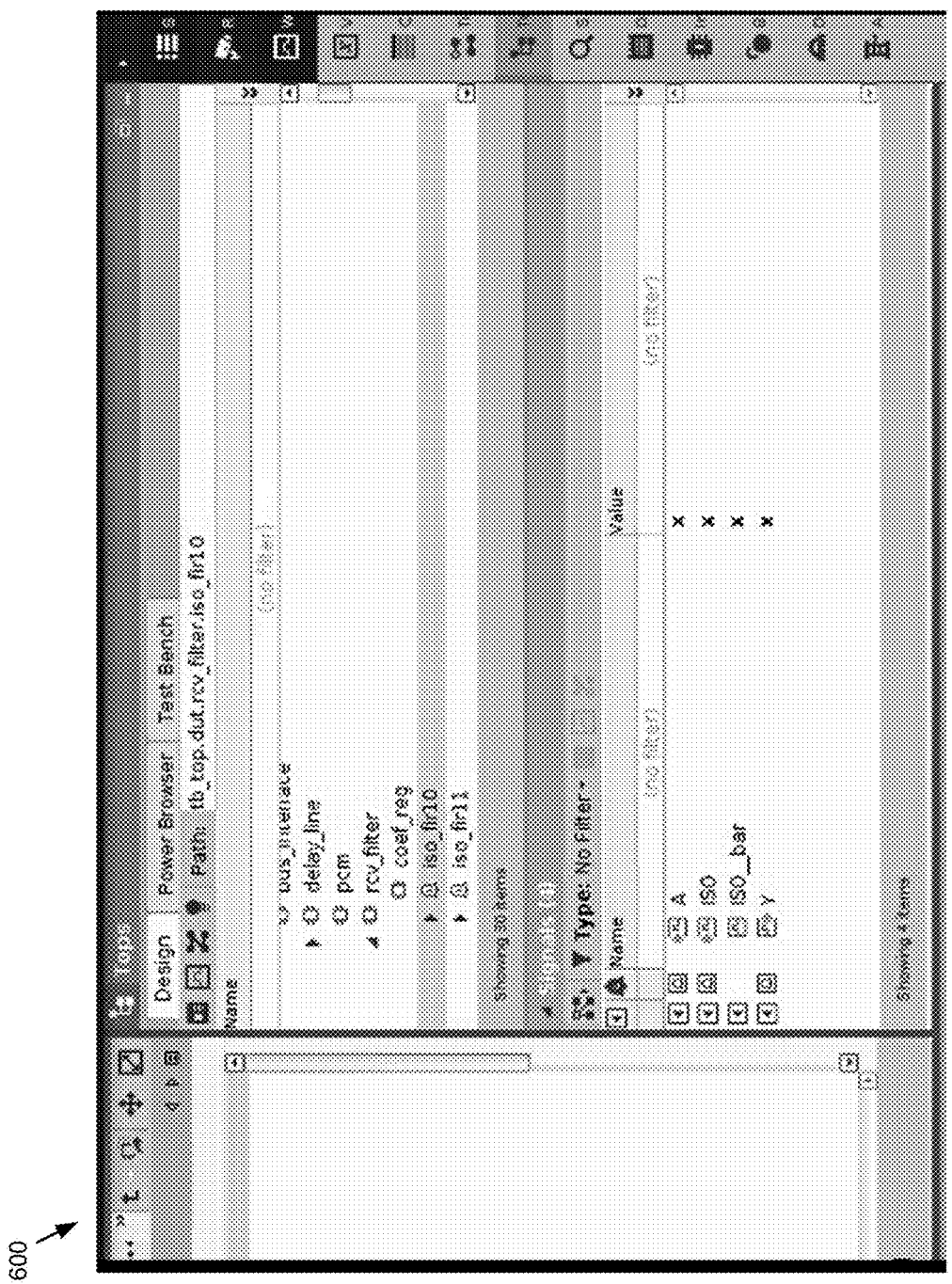
FIG. 6 is a schematic depicting aspects of the display process in accordance with an embodiment of the present disclosure.
Figure 7:
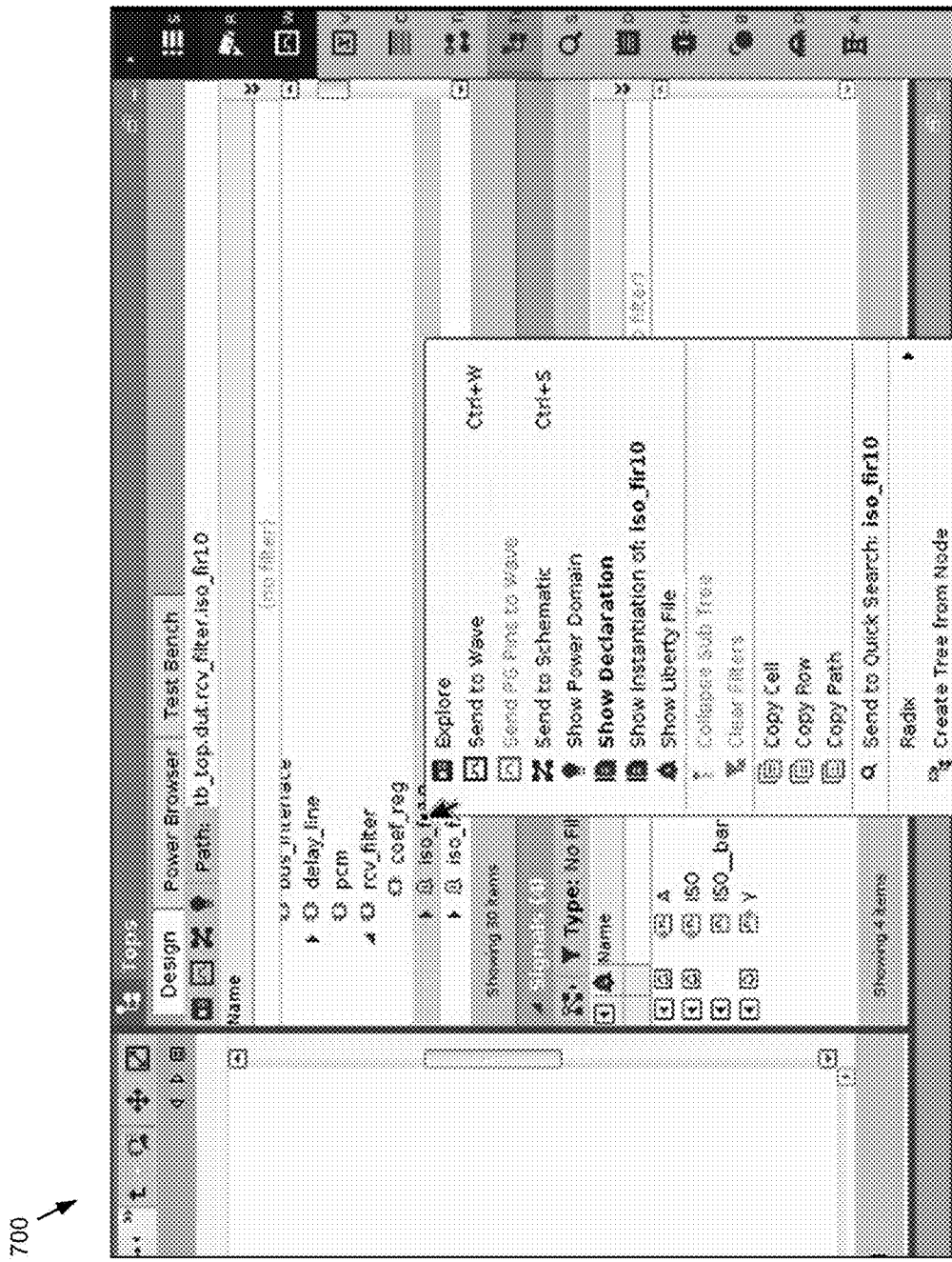
FIG. 7 is a schematic depicting aspects of the display process in accordance with an embodiment of the present disclosure.
Figure 8:
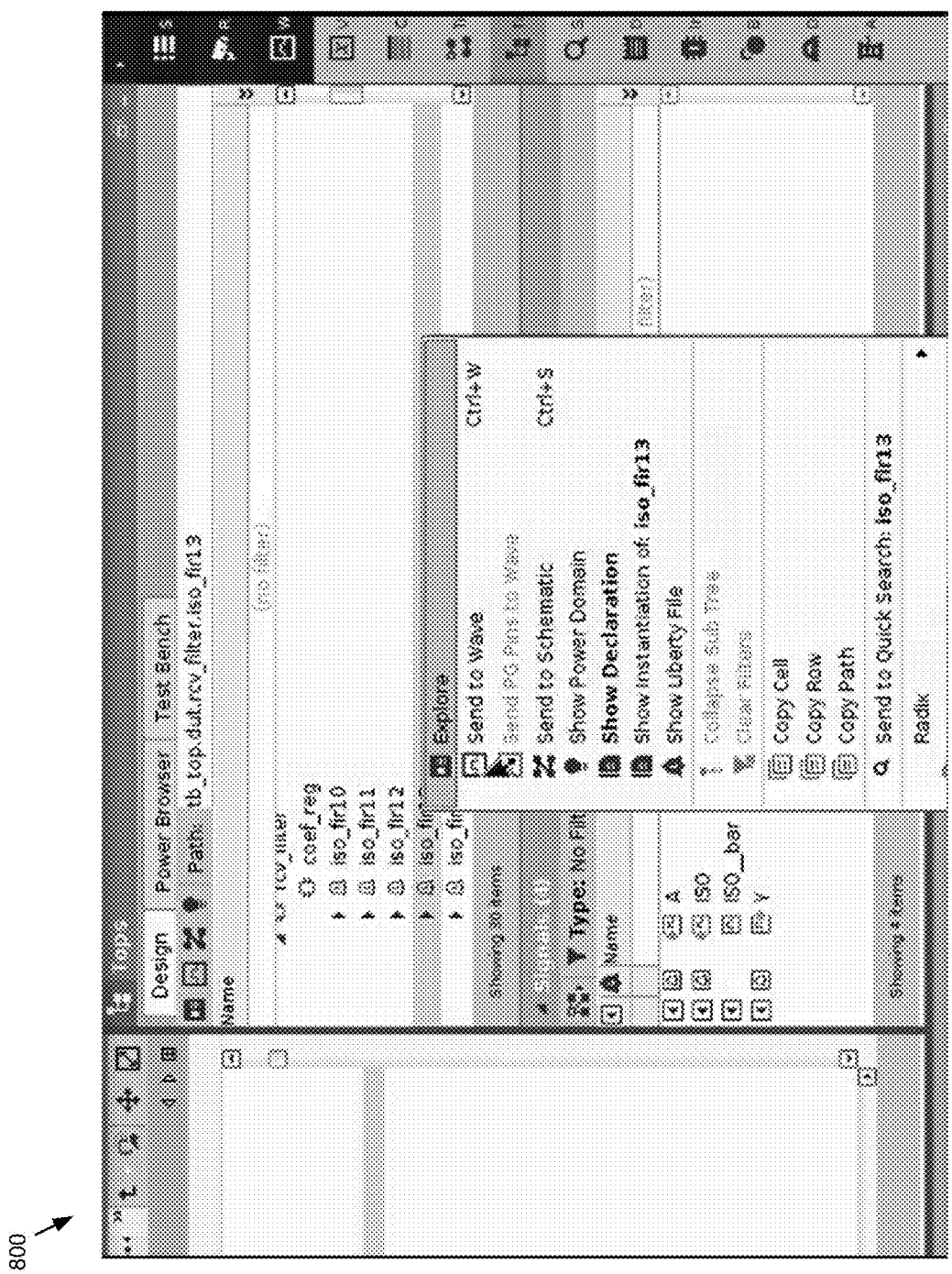
FIG. 8 is a schematic depicting aspects of the display process in accordance with an embodiment of the present disclosure.
Figure 9:
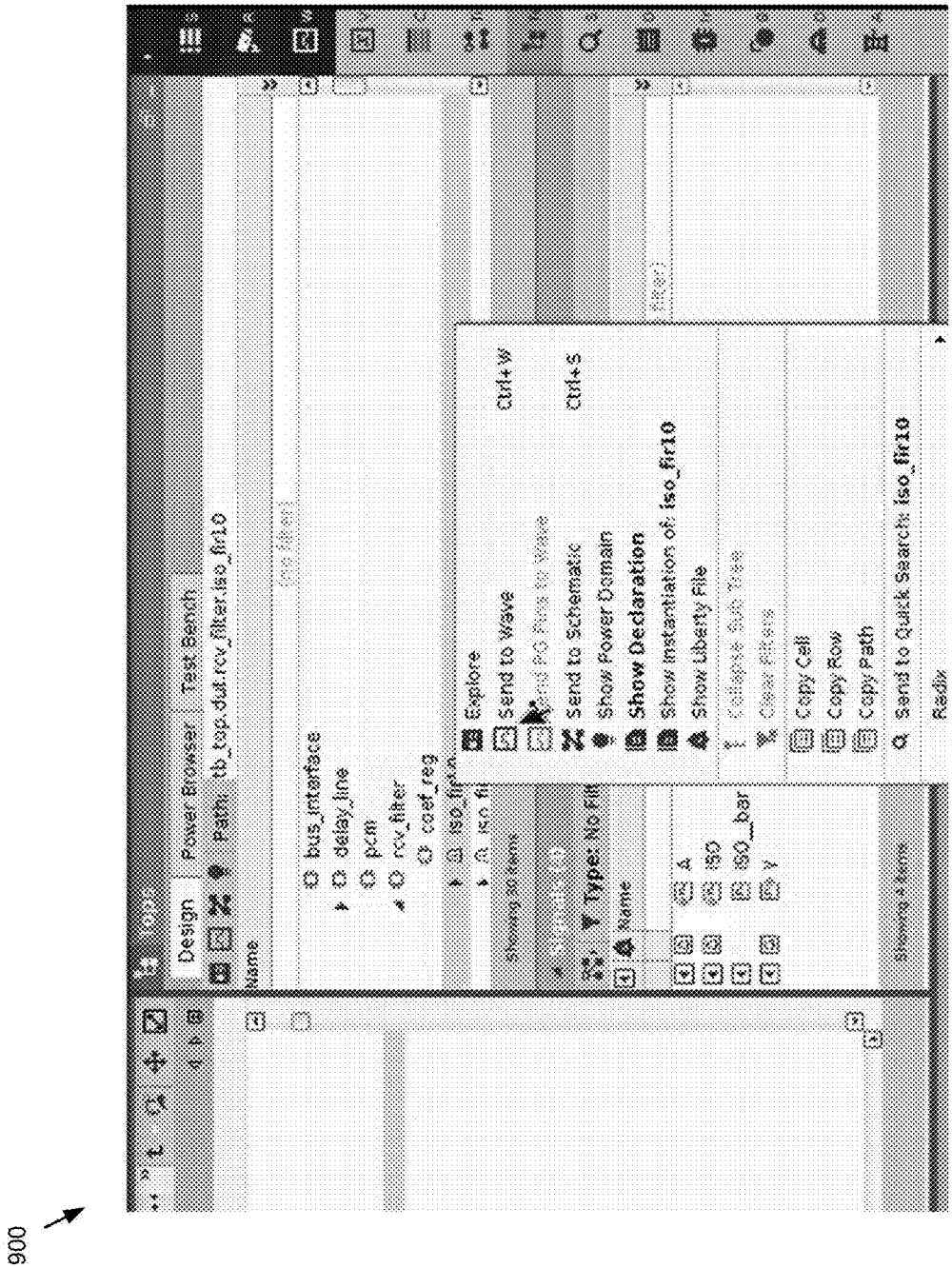
FIG. 9 is a schematic depicting aspects of the display process in accordance with an embodiment of the present disclosure.

Referring now to FIGS. 4-21, embodiments of display process show both the original Liberty file and then the extracted Liberty file in accordance with the teachings of the present disclosure. Referring now to FIG. 4, a GUI 400 depicting an example tops tree is provided. The tops tree may include numerous sub-browsers or GUIs, some of which may include, but are not limited to, a design browser, a power browser, a testbench, etc. FIG. 4 depicts the design browser display, which may include parts of the design as well as the signals that are part of it. In operation, upon selecting the "rcv filter" the signal pane may display information such as VDD, VDD_FIR31_SW, VSS, etc. These are supply nets and they may have values associated therewith. Data pin information may also be provided. As shown in the FIG. 4, a liberty bell icon is provided under the rcv filter icon. Upon selection of the liberty icon the data pins and/or supply pin information may be provided. For example, if the user right-clicks on this icon, and selects "Show Liberty File", it may provide an extracted Liberty file as shown in FIGS. 5-9. This may include the data that is extracted, such as, but not limited to, the PG pin, type, direction, etc. In operation, and upon scrolling down, each data pin may have a related power or a related ground and a direction. It should be noted that the specifics of the interface operability described herein may be changed and this example is provided merely for purposes of example. In some embodiments, the user may select any Liberty object (e.g., a pin, pg_pin, etc.) and send it to the waveform, original Liberty file, HDL source file, schematic, power browser, etc. There may also be Liberty attribute information which is associated with both pins and cells.

Figure 10:
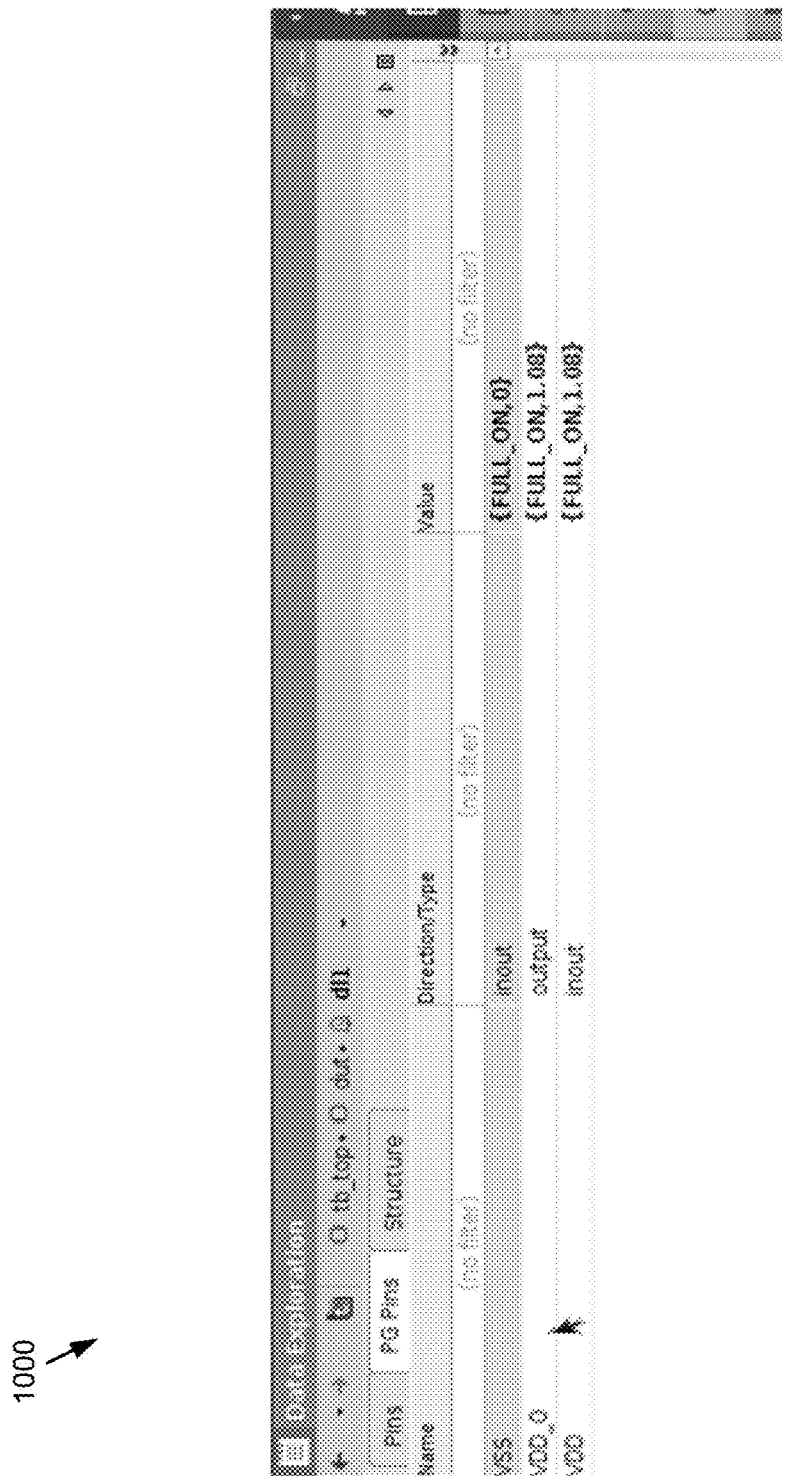
FIG. 10 is a schematic depicting aspects of the display process in accordance with an embodiment of the present disclosure.

In some embodiments, in addition to the extracted file, display process 10 may also receive the VSS pin or the external VDD, which may be text annotated and eventually provided to the waveform. FIG. 10 depicts an example of an explore window showing the power/ground pins. Additionally and/or alternatively, display process 10 may allow for the selection of "Show Declaration" option, which may provide the RTL part. This may refer to the same exact cell, however, in this example it provides the RTL part. This particular example is a non power aware model so it may not include VDD and ground. However, this information may be seen in the Liberty file. It should be noted that most Verilog code does not include VDD and ground. Embodiments of display process 10 may allow for the selection of the Liberty File, and the subsequent generation of VDD and ground graphically, for example, on the waveform viewer (even though the HDL version may not include this information).

Figure 11:
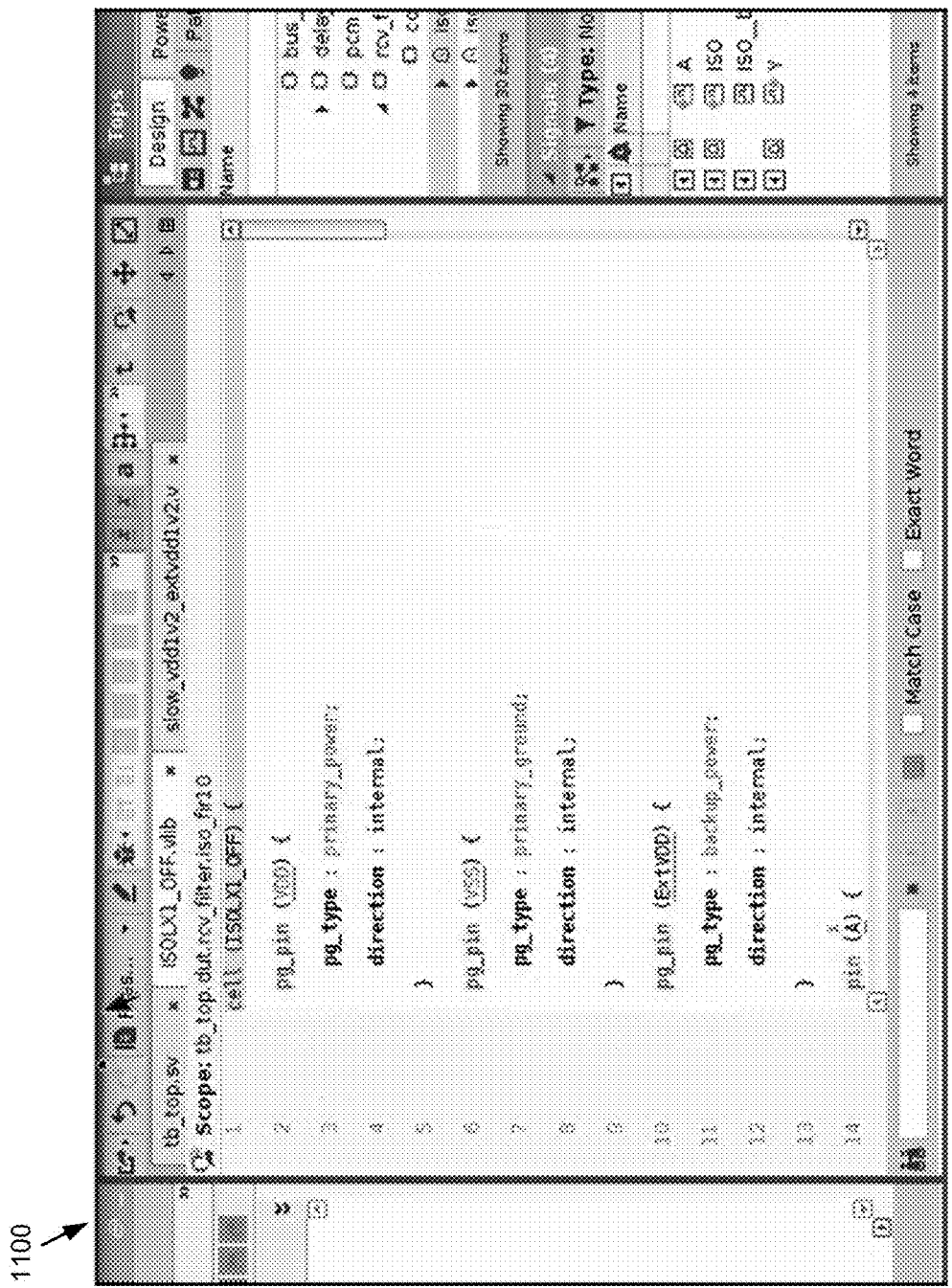
FIG. 11 is a schematic depicting aspects of the display process in accordance with an embodiment of the present disclosure.
Figure 12:
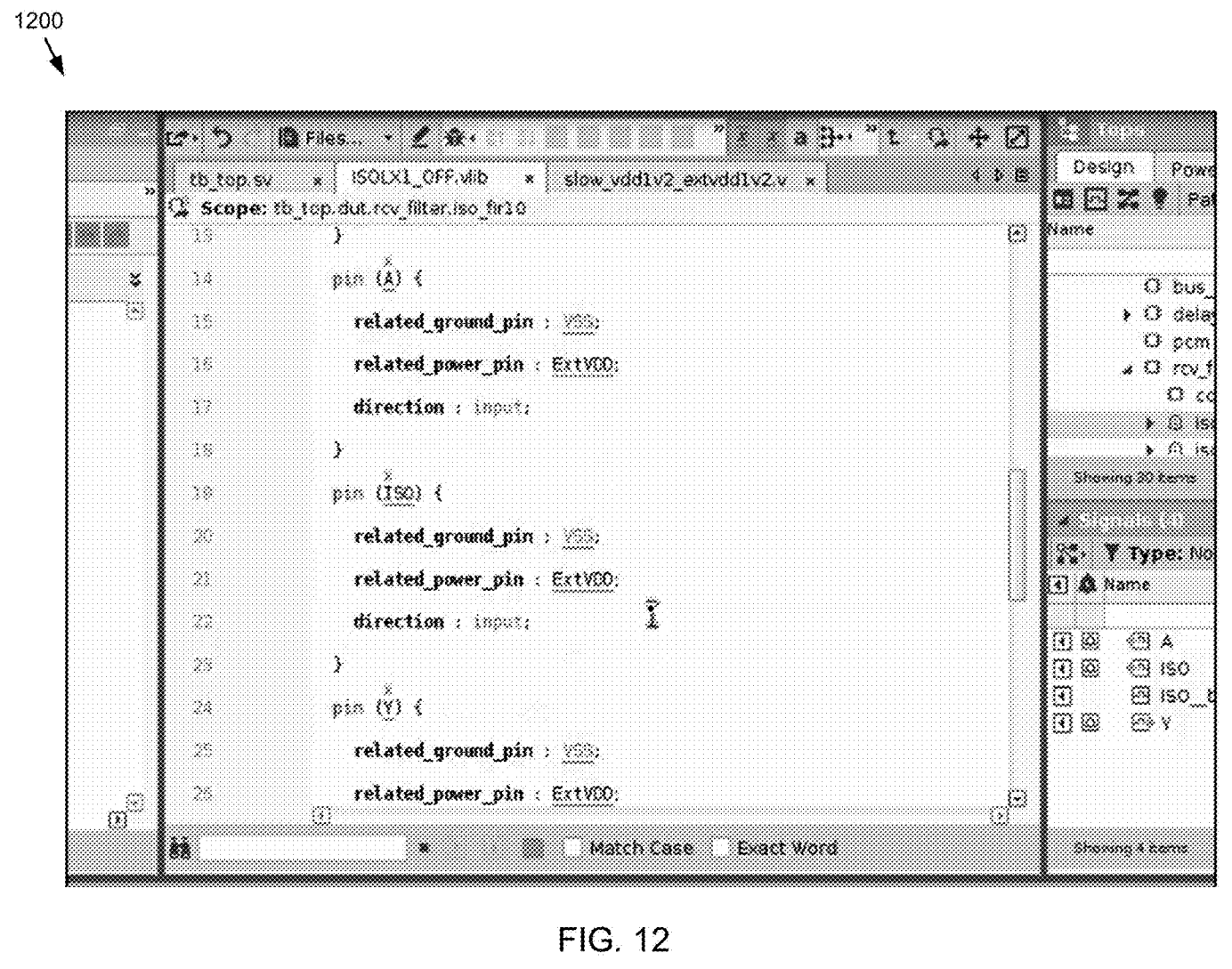
Figure 13:
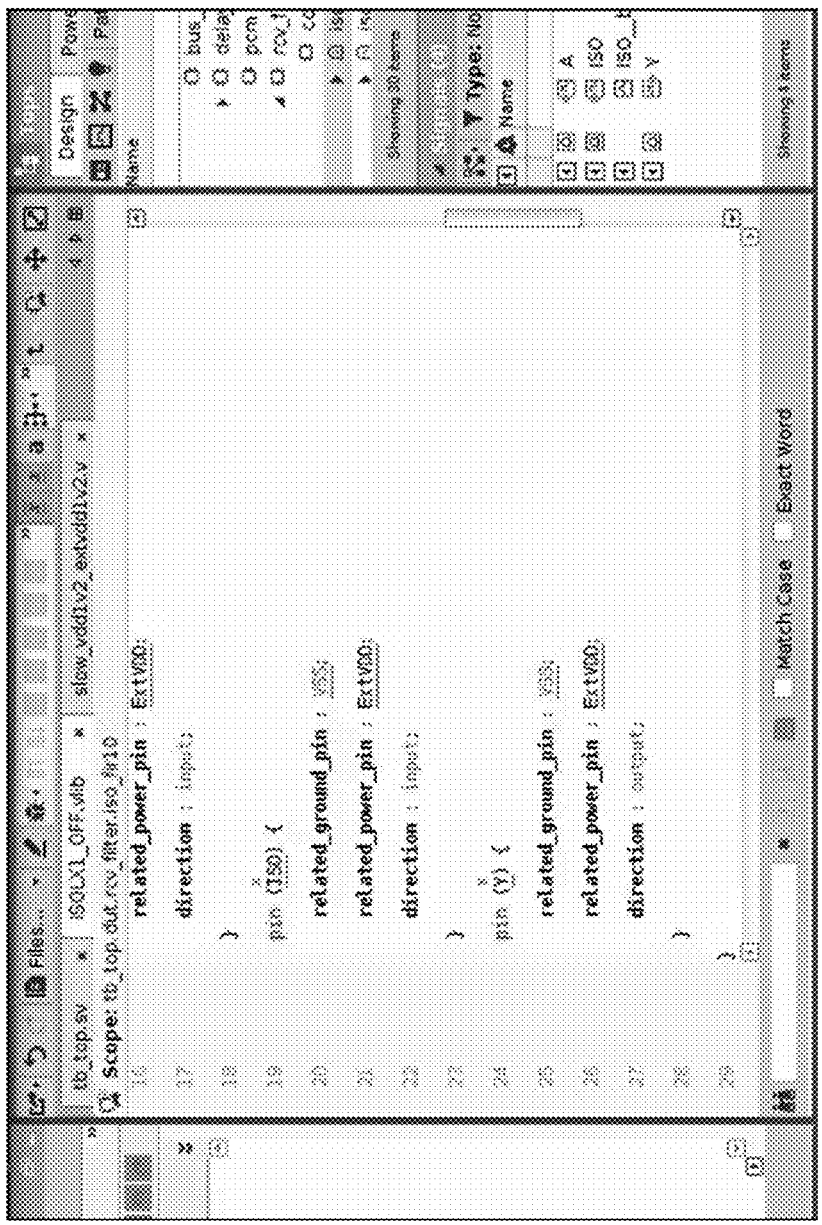
FIG. 13 is a schematic depicting aspects of the display process in accordance with an embodiment of the present disclosure.

Referring now to FIGS. 11-13, examples of extracted Liberty files are provided. In this example, PG pin for VDD, VSS, external VDD as well as the data pins are all displayed (e.g., A, ISO, and Y). These may include related power and related ground information. These are attributes that are in the Liberty file that may be automatically extracted. A and ISO are inputs and Y is an output. And if there was a power down function it would be associated with Y.

Figure 14:
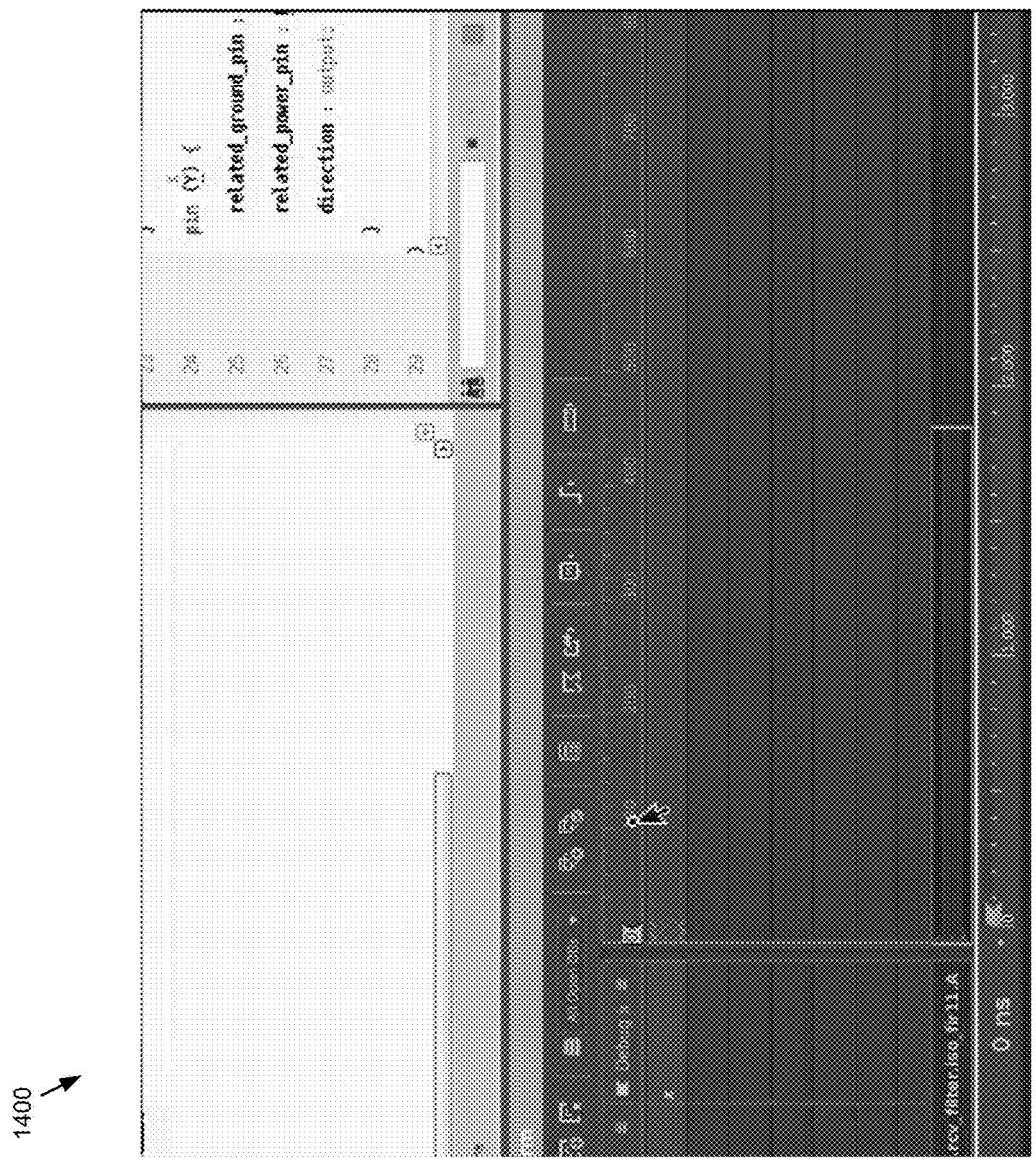
FIG. 14 is a schematic depicting aspects of the display process in accordance with an embodiment of the present disclosure.
Figure 15:
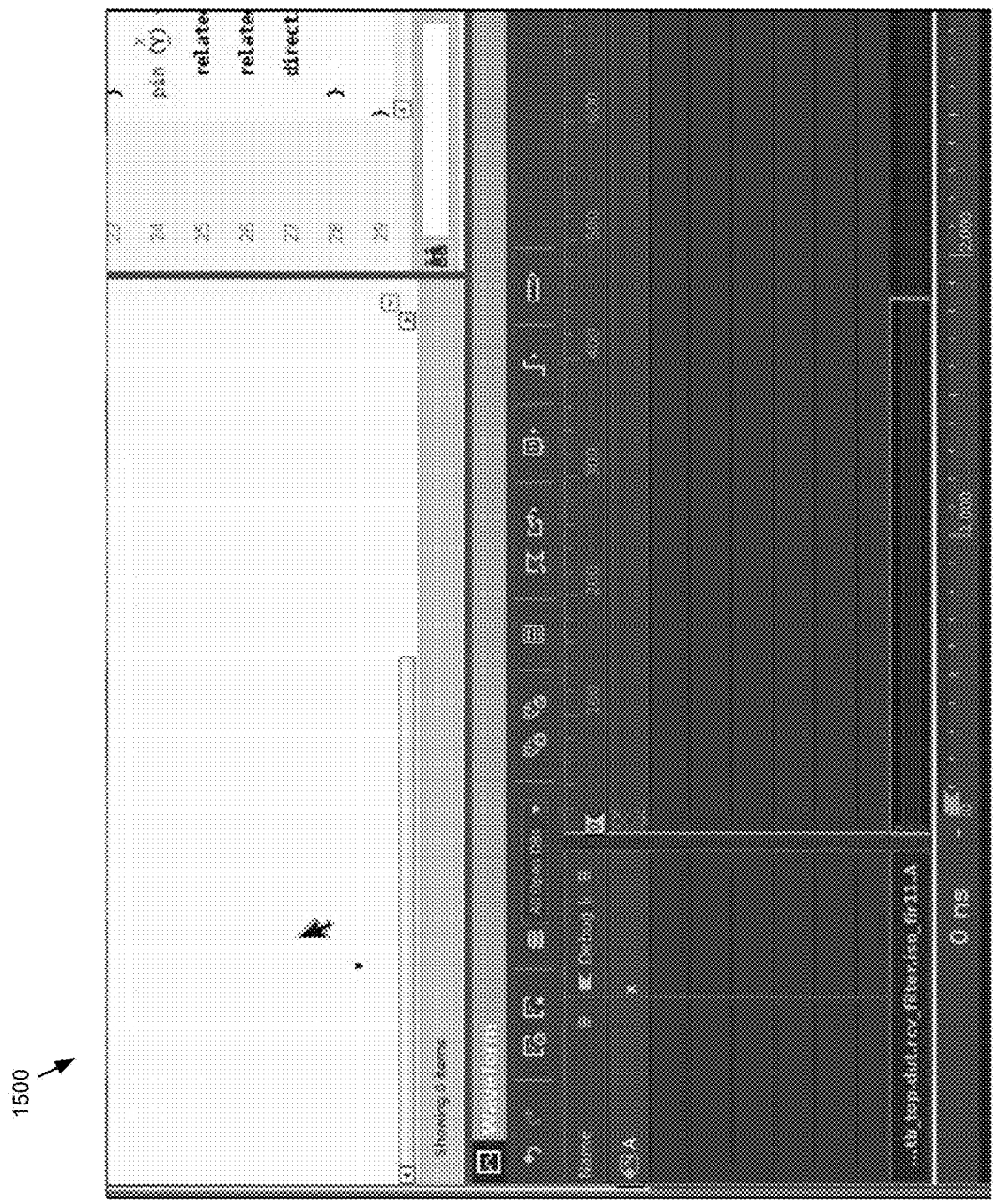
FIG. 15 is a schematic depicting aspects of the display process in accordance with an embodiment of the present disclosure.
Figure 16:
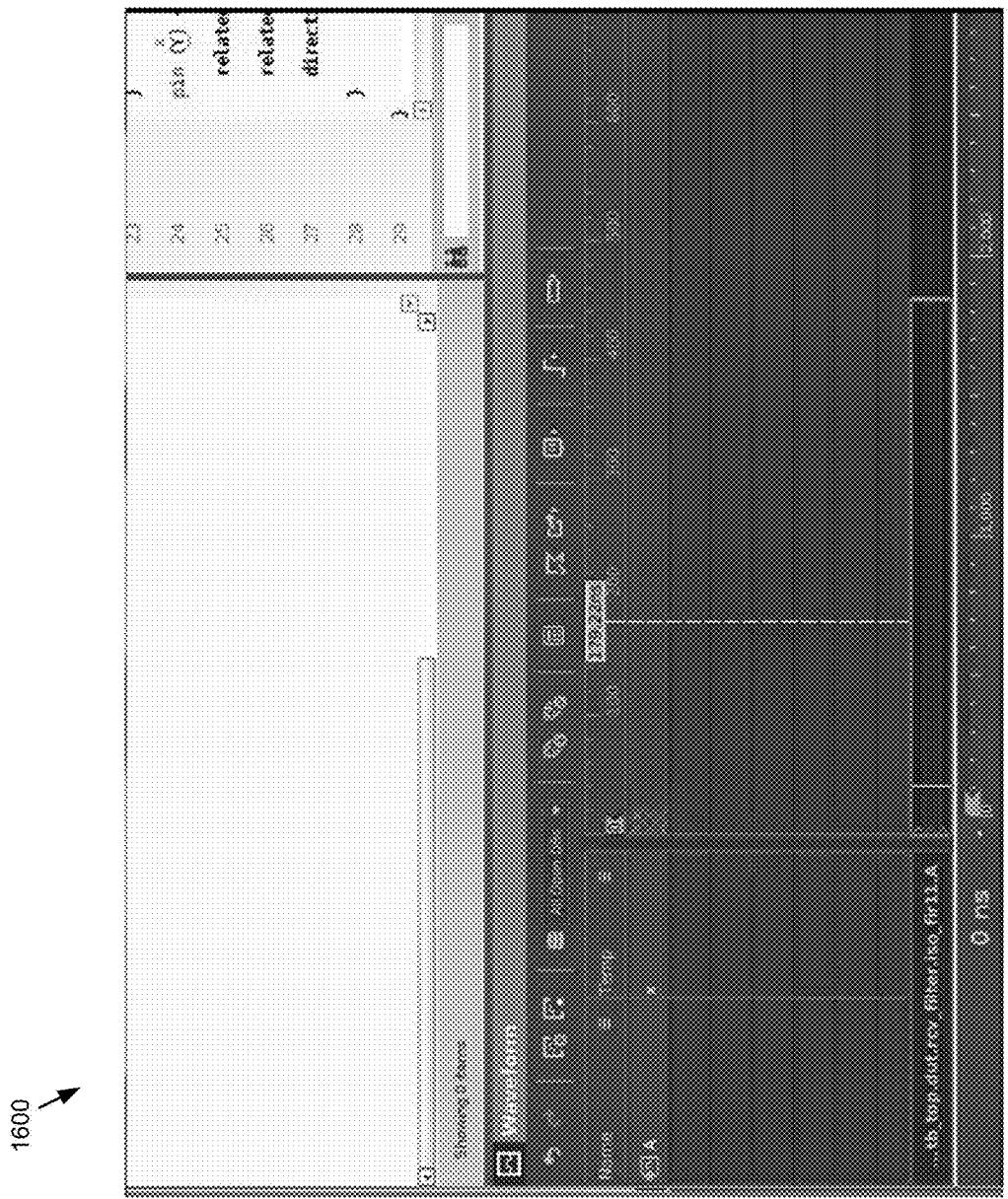
FIG. 16 is a schematic depicting aspects of the display process in accordance with an embodiment of the present disclosure.

Referring also to FIGS. 14-16, embodiments depicting waveforms that correspond to a selected signal that may be automatically sent to the waveform viewer. In this particular example shows an X, since no simulations have been run at this point.

Figure 17:
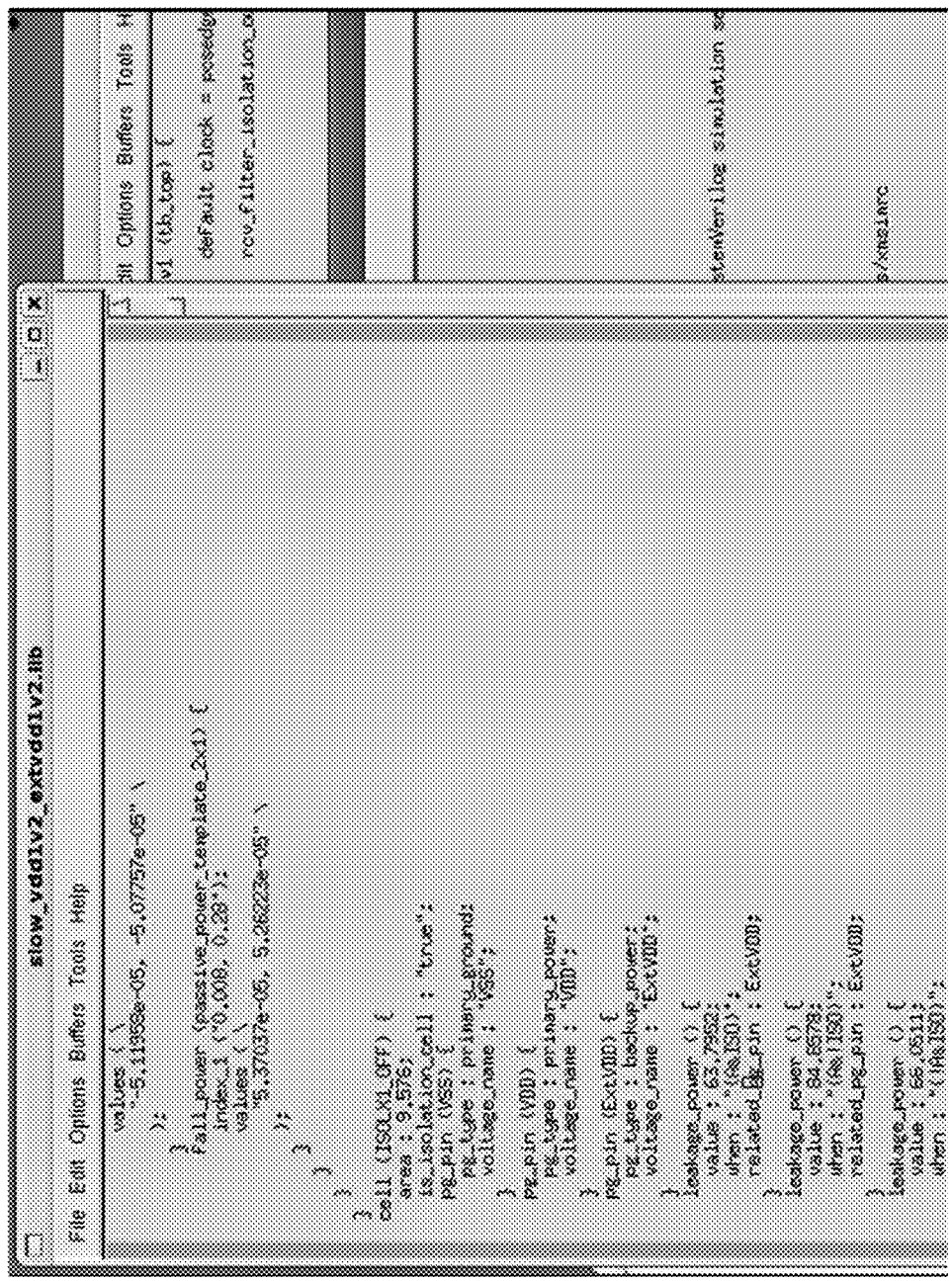
FIG. 17 is a schematic depicting aspects of the display process in accordance with an embodiment of the present disclosure.
Figure 18:
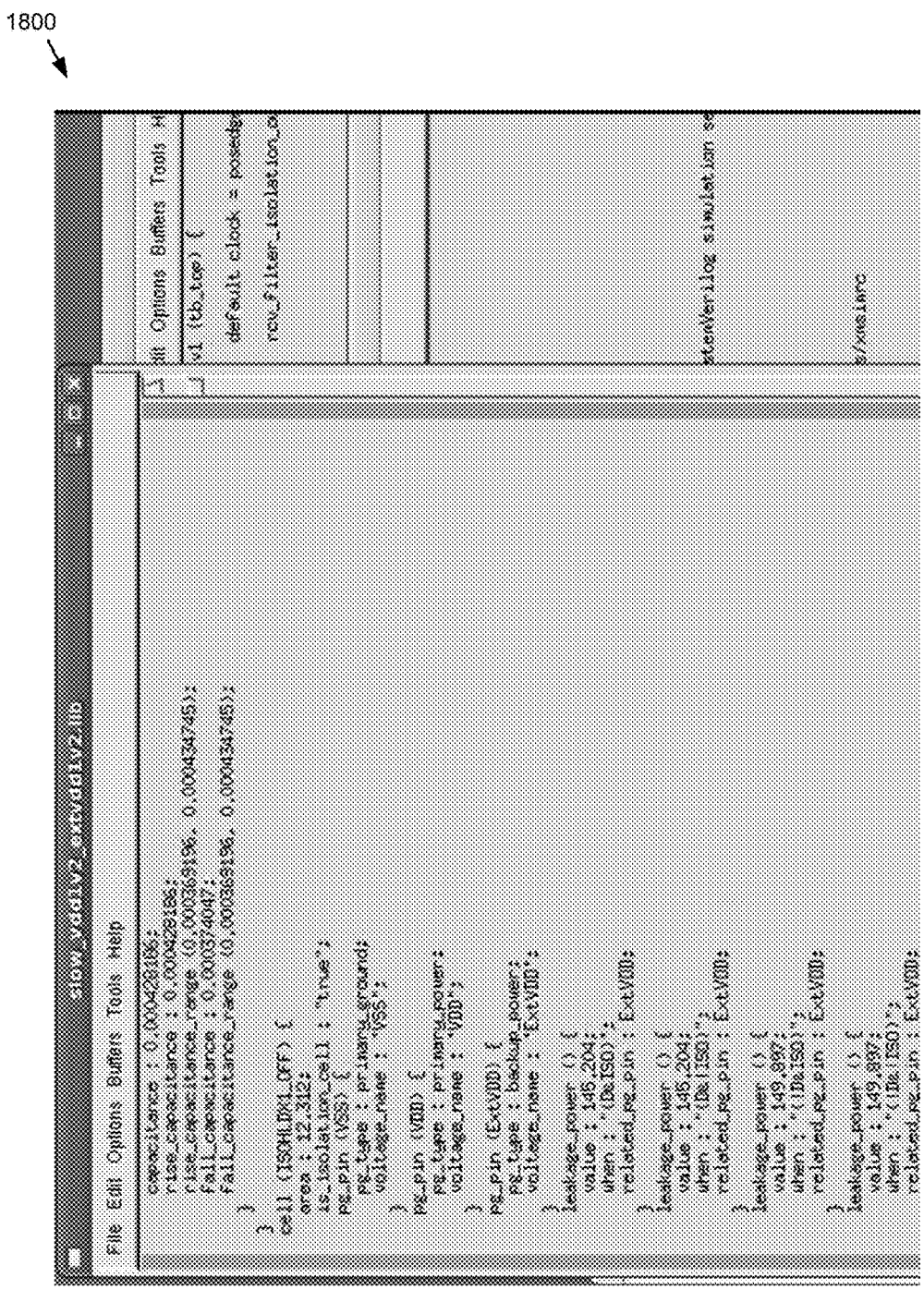
FIG. 18 is a schematic depicting aspects of the display process in accordance with an embodiment of the present disclosure.
Figure 19:
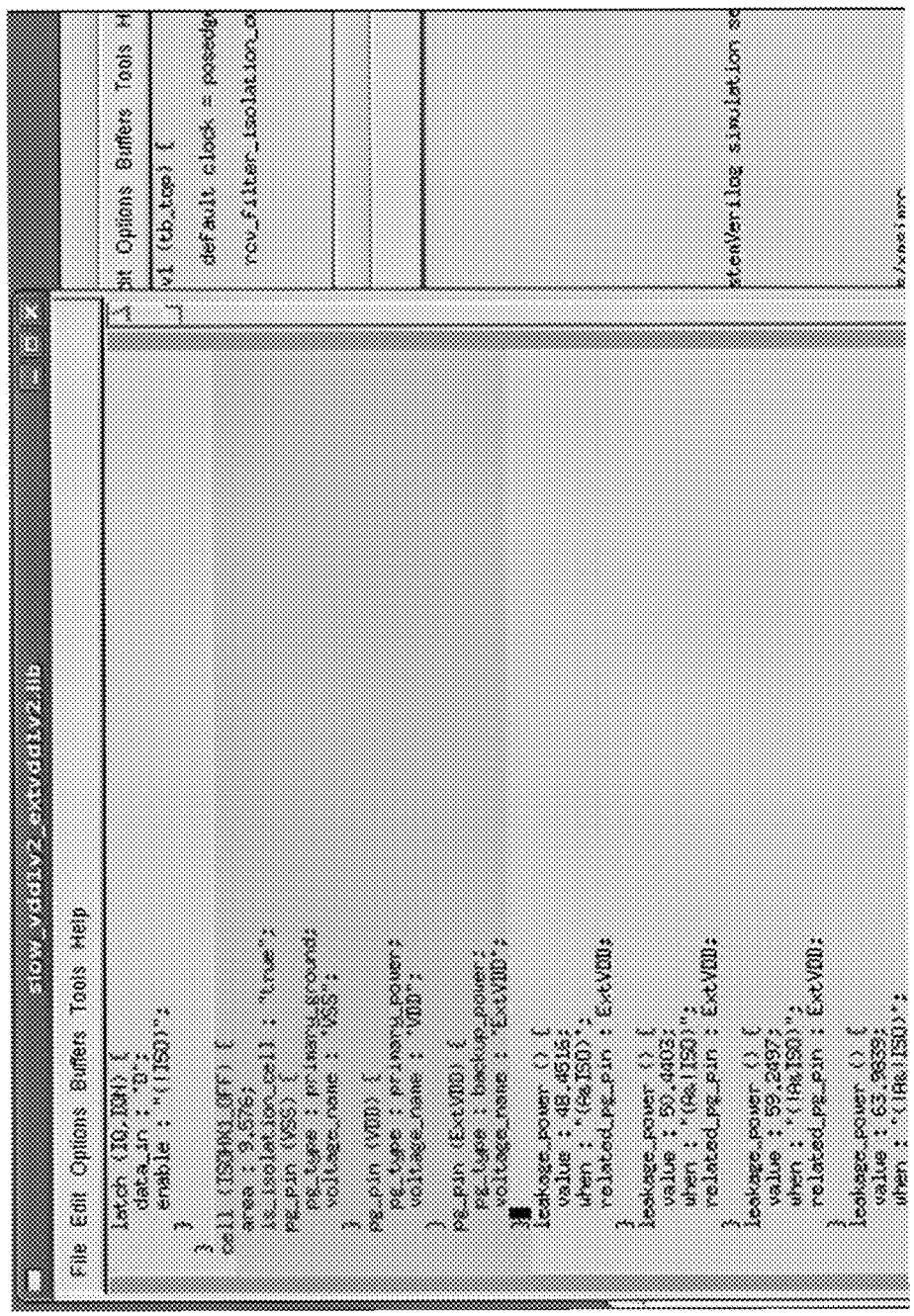
FIG. 19 is a schematic depicting aspects of the display process in accordance with an embodiment of the present disclosure.

Referring also to FIGS. 17-19, examples of typical cumbersome Liberty files are provided. These may include timing information, leakage, power information, etc. These examples are for only the ISO pin. This is in contrast to display process 10 where it was only a few lines.

Currently, in HDL verification environments there does not exist any debug support around liberty instances. Accordingly, embodiments of display process 10 may present to the user all of the relationships and data associated with the liberty low power intent on a cell and how it effects the simulation results.

In some embodiments, and as discussed above in the Figures, the display process described herein may be configured to generating virtual files and presenting them in IDE or debug tools. Embodiments included herein may be configured to extract the minimal set of attributes that are needed for Low Power debugging for each of the cells described in the Liberty file, and to generate one or more "virtual liberty files" as the need arises during the debug session. In those virtual liberty files, for example, embodiments included herein may be configured to only present that set of relevant attributes and only for the cell that is currently being examined by the user. Accordingly, the display process included herein may reduce a file that might include millions of lines to one file that includes mere hundreds—all of which are relevant to the user at that time of debug.

In some embodiments, during the elaboration of the design, display process 10 may include writing into a database all the information that is found in the original liberty file that relates to each pin and each pg pin of each cell described in the liberty file. That information may include, but is not limited to, the related power and related power of a given pin, the power down function of that pin if one was included in the original file, etc. In some embodiments, for the pg-pins display process 10 may record information such as its direction and kind and other relevant properties.

In some embodiments, display process 10 may also record into the database which supply net is connected to which pg-pins. This information is not found in the original liberty file, but may be needed in order to be able to later find the values of those pins and show them as source annotations.

In operation, during the debug session, the user might get to a point where the liberty file should be displayed to him. That may occur when the user performs driver tracing and one of the possible drivers is either a pin or a pg-pin. Another way the user might get to the Liberty file is if he/she selects an instance which is a liberty cell and asks to see the liberty definition of that instance. There are other such scenarios that are also within the scope of the present disclosure.

In some embodiments, instead of opening the huge liberty file, display process 10 may determine which cell is of interest to the user (e.g., by analyzing the type of the instance he/she was working with) and may generate a temporary file that includes all the low-power related liberty information from the database for that specific cell only. Accordingly, the user may be provided with only tens or hundreds of lines—containing all and only the information that is important to him at the scope of debugging low power issues. In this way, and since the designer was involved in generating the file, he/she may know where each pin and each pg pin is mentioned in the file, which allows the designer to add source annotations to them (without the need to parse the file). Since the full path of the supply nets that are connected to the different pg-pins were recorded embodiments included herein may also extract the values those pins have at any point in time—and present those values in the source annotations. That knowledge may allow for supporting any other action that is usually expected to be performed on the source annotations.

In some embodiments, display process 10 may also allow the user to open the original liberty file from the virtual liberty files that were created. As discussed above, each virtual file is describing a single cell. If the user decides to open the original liberty file from a specific virtual file, the source viewer may be adjusted to show the line in which that cell is defined in the original file.

In some embodiments, EDA application 20 may be configured to fuel testbench automation, analysis, and reuse for increased productivity. EDA application 20 may be configured to ensure verification quality by tracking industry-standard coverage metrics, including functional, transactional, low-power, and HDL code, plus automatic data and assertion checking. EDA application 20 may be configured to drive and/or guide verification with an automatically backannotated and executable verification plan. EDA application 20 may be configured to create reusable sequences and multi-channel virtual sequences on top of a multi-language verification environment and to configure existing Universal Verification Components (UVCs) or quickly constructs all-new UVCs. EDA application 20 may be configured to enable advanced debug for transaction-level models, SystemVerilog/e class libraries, transient mixed-signal, low-power, and traditional waveform analysis.

In some embodiments, EDA application 20 may supports e, Open Verification Library (OVL), OVM class library, emerging UVM class library, SystemC®, SystemC Verification Library, SystemVerilog, Verilog®, VHDL, PSL, SVA, CPF, as well as numerous other languages. EDA application 20 may be used in accordance with mixed-language, mixed-signal, and low-power designs, across multiple levels of abstraction, and may include the ability to "hot swap" the RTL simulation in/out of numerous accelerators/emulators.

In some embodiments, the schematic, GUIs, or windows described herein may be hierarchical. The term "hierarchical" as used herein, and in addition to its ordinary meaning, may refer to a system of groups and subgroups and/or submenus, which may allow a user to visualize certain portions of an electronic design while maintaining other portions of the electronic design as hidden, if desired.

As used in any embodiment described herein, the terms "circuit" and "circuitry" may include, for example, singly or in any combination, hardwired circuitry, programmable circuitry, state machine circuitry and/or firmware that stores instructions executed by programmable circuitry. It should be understood at the outset that any of the operations and/or operative components described in any embodiment herein may be implemented in software, firmware, hardwired circuitry and/or any combination thereof. Embodiments of the present disclosure may be incorporated in whole or in part into any design tools.

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:

1. A computer-implemented method for use in an electronic circuit design comprising:
   receiving, using a processor, an ASCII file including timing and power parameters associated with a portion of the electronic circuit design;
   analyzing the ASCII file, wherein the ASCII file is a Liberty file;
   receiving, at a graphical user interface, a selection of a part of the electronic circuit design;
   displaying, at the graphical user interface, information from the ASCII file associated with the selected part of the electronic circuit design, wherein the graphical user interface includes a display of a user-selectable hyperlink that provides an index to a portion of the Liberty file associated with the selected part of the electronic circuit design; and
   parsing, via the graphical user interface, the information using one or more user-selectable parameters.

2. The computer-implemented method of claim 1, wherein the information from the ASCII file includes at least one of power information, ground information, pin information, direction information, related power information, related ground information, and power down function information.

3. The computer-implemented method of claim 1, wherein the Liberty file is compiled and stored in a queryable database.

4. The computer-implemented method of claim 1, wherein the graphical user interface is dynamically linked to a simulation.

5. The computer-implemented method of claim 1, wherein parsing includes filtering the information based upon, the one or more user-selectable parameters to generate a subset of the information.

6. The computer-implemented method of claim 1, further comprising:
   allowing for a selection of an item in the graphical user interface; and
   generating a change in a second graphical user interface, based upon, at least in part, the selection.

7. A computer-readable storage medium for use in an electronic circuit design, the computer-readable storage medium having stored thereon instructions that when executed by a machine result in the following operations:
   receiving, using a processor, an ASCII file including timing and power parameters associated with a portion of the electronic circuit design;
   analyzing the ASCII file, wherein the ASCII file is a Liberty file;
   receiving, at a graphical user interface, a selection of a part of the electronic circuit design;
   displaying, at the graphical user interface, information from the ASCII file associated with the selected part of the electronic circuit design, wherein the graphical user interface includes a display of a user-selectable hyperlink that provides an index to a portion of the Liberty file associated with the selected part of the electronic circuit design; and
   parsing, via the graphical user interface, the information using one or more user-selectable parameters.

8. The computer-readable storage medium of claim 7, wherein the information from the ASCII file includes at least one of power information, ground information, pin information, direction information, related power information, related ground information, and power down function information.

9. The computer-readable storage medium of claim 7, wherein the Liberty file is compiled and stored in a queryable database.

10. The computer-readable storage medium of claim 7, wherein the graphical user interface is dynamically linked to a simulation.

11. The computer-readable storage medium of claim 7, wherein parsing includes filtering the information based upon, the one or more user-selectable parameters to generate a subset of the information.

12. The computer-readable storage medium of claim 7, further comprising:
allowing for a selection of an item in the graphical user interface; and
generating a change in a second graphical user interface, based upon, at least in part, the selection.

13. A system for use with an electronic circuit design comprising:
a computing device having at least one processor configured to receive an ASCII file including timing and power parameters associated with a portion of the electronic circuit design, the at least one processor further configured to analyze the ASCII file, wherein the ASCII file is a Liberty file, the at least one processor further configured to receive, at a graphical user interface, a selection of a part of the electronic circuit design and display, at a graphical user interface, information from the ASCII file associated with the selected part of the electronic circuit design, wherein a graphical user interface includes a display of a user-selectable hyperlink that provides an index to a portion of the Liberty file associated with the selected part of the electronic circuit design, the at least one processor further configured to parse, via the graphical user interface, the information using one or more user-selectable parameters.

14. The system of claim 13, wherein the information from the ASCII file includes at least one of power information, ground information, pin information, direction information, related power information, related ground information, and power down function information.

15. The system of claim 13, wherein the Liberty file is compiled and stored in a queryable database.

16. The system of claim 13, wherein the graphical user interface is dynamically linked to a simulation.

17. The system of claim 13, wherein parsing includes filtering the information based upon, the one or more user-selectable parameters to generate a subset of the information.

* * * * *